Patented June 14, 1938

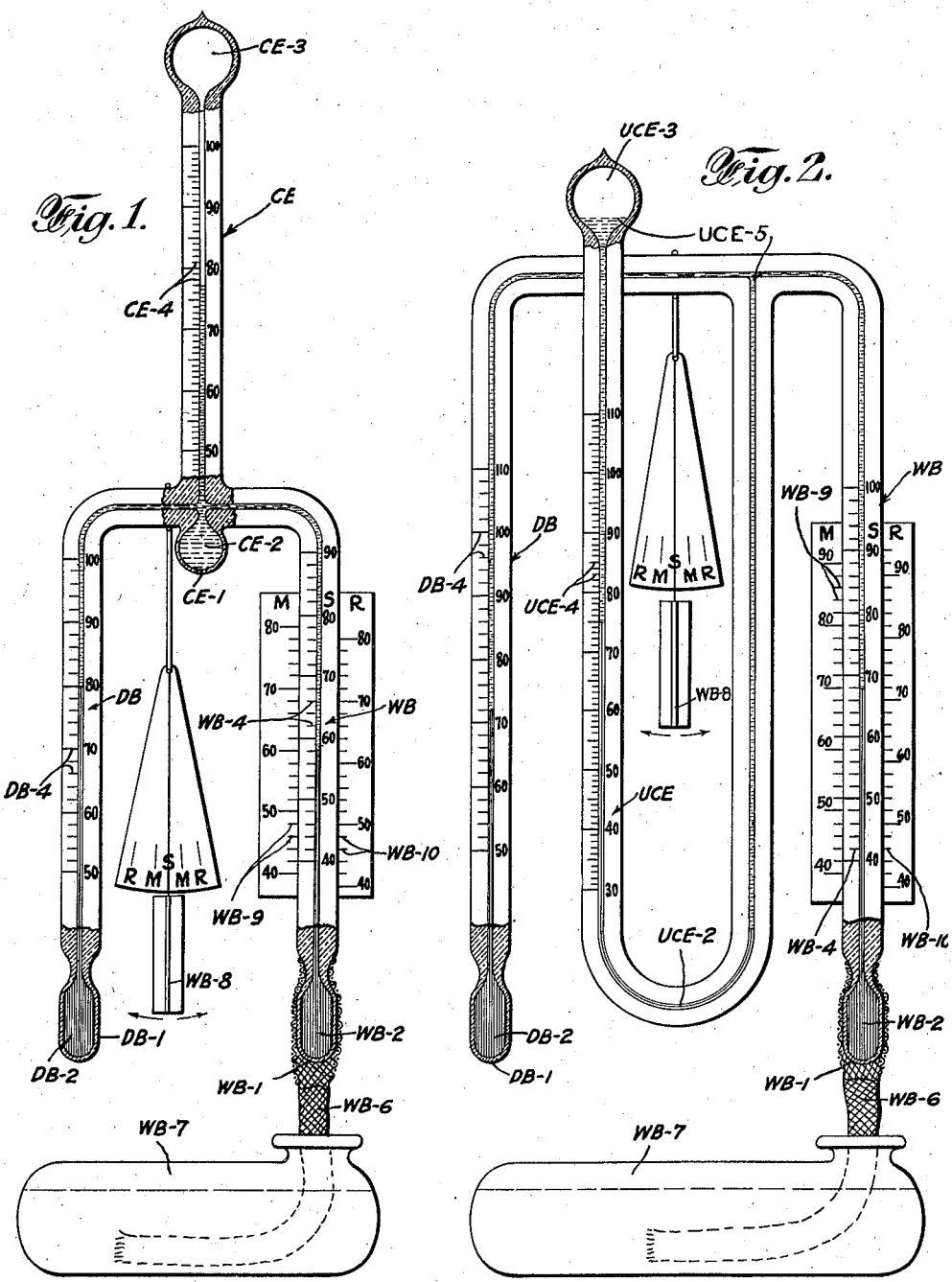

2,120,952

UNITED STATES PATENT OFFICE 2,120,952

APPARATUS FOR ASCERTAINING AND APPRAISING EFFECTIVE TEMPERATURE

John Parsons, New York, N. Y.

Application June 29, 1935, Serial No. 29,038

5 Claims. (Cl. 73—338)

The herein described invention relates to an effective temperature thermometer in which the three determinants, sensible heat, latent heat and air movement are correlated into a single factor. The degree of warmth a human body feels in response to the surrounding air depends upon three principal factors, temperature of the air, moisture content of the air and movement of the air.

With the rapidly expanding development of the control of these factors in so-called "air conditioning" for interior use, a keener interest and a better understanding of these factors by the general public is natural. There are numerous devices for ascertaining separately the degree of sensible heat, the relative humidity and movement of the air. By correlating these factors charts have been devised, such as the A. S. H. V. in co-operation with the Bureau of Mines, to produce what is called an "effective temperature" scale. To make proper use of this knowledge and apply it in a practical way has required the use of several instruments plotted against charts, requiring careful computation, with always the chance of human error. A device that automatically correlates these values into a single factor denoting the net effect is highly desirable. It is a well understood fact that a wet bulb thermometer reads higher in still air, due to the aura of denser humidity directly surrounding it, against air in motion, which dissipates this aura. This depends to some extent on the shape of the wet bulb, a spherical bulb producing a larger aura than an elongated bulb. The human body has a function similar to this action, in the dissipation of latent heat of evaporation by means of the pores, and likewise depends upon the relative humidity and air motion. Contrary to general practice, but substantiated by the highest authorities, a wet bulb, if it is to indicate the true effect of the conditions as related to human comfort, should be read without superinducing additional air movement beyond that which prevails normally.

An object of this invention is a thermally sensitive instrument which gives a direct reading of effective temperature.

Other objects, novel features and advantages of this invention will become apparent from the following specification and accompanying drawing, wherein:

Fig. 1 illustrates one form of instrument embodying the invention, and

Fig. 2 illustrates a second form of instrument.

In Fig. 1, a capillary tube CE is provided at its lower end with a reservoir CE—1 in which is contained a thermally sensitive liquid CE—2 such, for example, as colored creosote. At the upper end of the tube is provided an expansion chamber CE—3 and along the tube are provided scale indications CE—4. A dry bulb thermometer DB is joined at its upper end through a capillary passage to the tube CE above the reservoir CE—1. At the lower end of the thermometer DB is provided a reservoir DB—1 in which is contained a thermally sensitive liquid DB—2, such, for example, as mercury and scale indications DB—4 are provided along the thermometer tube. A second or wet bulb thermometer WB has its upper end joined through a capillary passage with the tube CE above the reservoir CE—1. The wet bulb thermometer is provided with a reservoir WB—1 in which is contained thermally sensitive liquid WB—2 such, for example, as mercury. Along the tube of the wet bulb thermometer are provided scale indications WB—4. A wick WB—6 surrounds the reservoir WB—1 and extends into a water reservoir WB—7. Also, a dangler WB—8 is suitably suspended and co-operates with a scale having the markings S, M and R, through the medium of which is obtained an indication of air movement. Additional scales WB—9 and WB—10 are associated with the wet bulb thermometer and have identifying insignia M and R. Creosote is contained in the passages leading from the two thermometers to the capillary tube CE and extends into contact with the mercury in said thermometers.

The volumetric expansion of DB—1 and CE—1 is equal to that of WB—1 and in their combined influence constitute half the volumetric expansion resulting in the capillary tube CE. The scale CE—4 is graduated to the action of the liquid CE—2 to indicate the same temperature as the dry bulb thermometer DB when the wet bulb thermometer WB indicates a temperature in still air corresponding to 50% relative humidity from 50° F. up. The liquid in the capillary tube CE indicates a temperature higher than the dry bulb temperature DB proportionately as the wet bulb thermometer WB indicates higher than 50% relative humidity and indicates a temperature lower than the dry bulb thermometer as the wet bulb thermometer WB indicates less than 50% relative humidity.

In Fig. 1 is shown the relative position of the three different sensitive elements when indicating an effective temperature of 77° by the tube CE. The dry bulb thermometer registers a sensible heat temperature of 80° while the wet bulb registers a latent heat temperature of 58°. This gives a direct reading under still air conditions in which the dangler WB is quiescent. However, should there be air motion, an adjustment of the reading on CE would be made by taking into consideration the reading on the scale WB—9 or WB—10 according to whether the dangler was swinging between M and M or between R and R.

The mercury and creosote are immiscible and of different color so that there is a sharp dividing line between them, making it possible accurately to read the position of the mercury on the dry bulb and wet bulb scales. The liquid in the reservoir CE—2 supplements the action of the dry bulb thermometer or by use of a wet wick may be made to supplement the action of the wet bulb thermometer in the final registry of the sensitive element of the capillary tube CE. If the added action of the liquid in the intermediary reservoir is not desired, it may be dispensed with.

Preferably the capillary tube is calibrated against the fluid column therein to read the same degree as the dry bulb temperature when the respective temperatures of the dry and wet bulb thermometers indicate a relative humidity of 50% by a psychrometric chart, as follows:

50.25 wet bulb, 60 dry bulb, 60 composite
58.50 wet bulb, 70 dry bulb, 70 composite
66.75 wet bulb, 80 dry bulb, 80 composite
75 wet bulb, 90 dry bulb, 90 composite
83.25 wet bulb, 100 dry bulb, 100 composite The instrument disclosed in Fig. 2 is generally similar to that disclosed in Fig. 1, except that the capillary tube UCE is U shape with the expansion chamber UCE—3 at the upper end of one leg and with the other leg joined at its upper end through passages to the upper ends of the dry bulb thermometer DB and wet bulb thermometer WB. One leg of the tube UCE is provided with the scale indications UCE—4 and the bight of the U is filled with mercury UCE—2 extending upwardly across the scale indications UCE—4. Creosote is arranged above the ends of the mercury column in each leg of the U and in one leg extends into the expansion chamber UCE—3 while in the other leg extends into contact with the mercury in the wet and dry bulb thermometers. The operation of this form of the invention is the same as described in connection with Fig. 1.

In both forms of the device, direct reading of effective temperature is obtained from the capillary tubes CE and UCE when the air is quiescent. In the event of there being air movement, the reading is corrected by reference to the wet bulb thermometer scales WB—9 and WB—10 according to the indications given by the dangler WB—8.

It will readily be seen that the devices shown are designed to register a composite value, combining the factors sensible heat, latent heat or relative humidity and air movement. While acknowledging the common use of thermometers and other devices for indicating separately temperature, humidity and air movement, and making no claim to invention of such devices when thus used separately, I do claim novelty and invention when combined as herein described, and for the purpose as herein disclosed, of producing a composite indication of their individual attributes in a single composite factor denoting effective temperature.

I claim:

1. A device for indicating effective temperature comprising a dry bulb mercury thermometer, a wet bulb mercury thermometer, a capillary tube, interconnections between the top of said two thermometers and the bottom of said capillary tube and creosote contained in said capillary tube and interconnections, said creosote extending into contact with the mercury of said thermometers.

2. A device for indicating effective temperature comprising a dry bulb mercury thermometer and a wet bulb mercury thermometer, a capillary tube in the form of a U partially filled with mercury and having an expansion chamber at one end, interconnections between the opposite end of said U tube and the top portions of said thermometers and creosote interposed between the mercury in said capillary tube and the mercury in said thermometers.

3. A device according to claim 2 in which one leg of said U tube contains mercury and is in parallel relation to both said thermometers.

4. A device for indicating effective temperature comprising a dry bulb mercury thermometer, a wet bulb mercury thermometer, a capillary tube having a reservoir at one end and an expansion chamber at the other end, passageways connecting said capillary tube to the top of said thermometers, and thermally sensitive liquid in said capillary tube reservoir and passageways, said liquid being immiscible with mercury and extending into contact with the mercury in said thermometers.

5. A device for indicating effective temperature comprising a dry bulb mercury thermometer, a wet bulb mercury thermometer, a capillary tube, interconnections between the top of said thermometers and the bottom of said capillary tube, and liquid in said capillary tube and interconnections extending into contact with the mercury of said thermometers and being immiscible therewith.

JOHN PARSONS.